United States Patent [19]
Kachmarik et al.

[11] Patent Number: 5,719,472
[45] Date of Patent: Feb. 17, 1998

[54] HIGH VOLTAGE IC-DRIVEN HALF-BRIDGE GAS DISCHARGE BALLAST

[75] Inventors: David J. Kachmarik, Strongsville; Louis R. Nerone, Brecksville, both of Ohio

[73] Assignee: General Electric Company, Schenectady, N.Y.

[21] Appl. No.: 648,232

[22] Filed: May 13, 1996

[51] Int. Cl.$^6$ .................................................. H05B 37/02
[52] U.S. Cl. .................... 315/224; 315/307; 315/291; 315/DIG. 5; 315/DIG. 7
[58] Field of Search ..................... 315/307, 209 R, 315/224, 244, 291, 245, DIG. 5, DIG. 7

[56] References Cited

U.S. PATENT DOCUMENTS

| | | | |
|---|---|---|---|
| 4,585,974 | 4/1986 | Stupp et al. | 315/307 |
| 4,791,338 | 12/1988 | Dean et al. | 315/174 |
| 5,051,662 | 9/1991 | Counts | 315/247 |
| 5,075,599 | 12/1991 | Overgoor et al. | 315/224 |
| 5,382,881 | 1/1995 | Farkas et al. | 315/307 |
| 5,382,882 | 1/1995 | Nerone | 315/307 |
| 5,406,177 | 4/1995 | Nerone | 315/307 |
| 5,408,162 | 4/1995 | Williams | 315/224 |
| 5,612,597 | 3/1997 | Wood | 315/293 |
| 5,619,104 | 4/1997 | Eunghwa | 315/159 |

OTHER PUBLICATIONS

"Ballast IC Applications Information (IR2151): Pre–Heating a Lamp Filament Without a PTC Resistor," International Rectifier Corporation, Oct. 1994, three pages.

"L6569: High Voltage Half Bridge Driver with Oscillator," SGS–Thompson Microelectronics, Mar. 1996, six pages.

"Provisional Data Sheet on IR 2155 Self–Oscillating Power MOSFET/IGBT Gate Driver," International Rectifier, Aug., 1993, five pages the IR2155 driver being functional similar to the IR2151 driver mentioned at page 3 of the present specification.

*Primary Examiner*—Robert Pascal
*Assistant Examiner*—Haissa Philogene
*Attorney, Agent, or Firm*—George E. Hawranko

[57] ABSTRACT

A ballast circuit for a gas discharge lamp includes a resonant load circuit incorporating a gas discharge lamp and including first and second resonant impedances whose values determine the operating frequency of the resonant load circuit. Further included is a d.c.-to-a.c. converter circuit coupled to the resonant load circuit so as to induce an a.c. current in the resonant load circuit. The converter includes first and second switches serially connected between a bus conductor at a d.c. voltage and ground, and has a common node through which the a.c. load current flows. A feedback circuit provides a feedback signal indicating the level of current in the resonant load circuit. A high voltage IC drives the first and second switches at a frequency determined by a timing signal which predominantly comprises the feedback signal during lamp ignition, whereby during lamp ignition the feedback signal causes the high voltage IC to drive the first and second switches towards a switching frequency which promotes resonant operation of the resonant load circuit.

17 Claims, 4 Drawing Sheets

Fig—1

HIGH VOLTAGE IC-DRIVEN HALF-BRIDGE GAS DISCHARGE BALLAST

FIELD OF THE INVENTION

The present invention relates to a ballast circuit for a gas discharge lamp which employs a high voltage integrated circuit (HVIC) for driving a pair of serially connected switches that supply a.c. current to the lamp, and, more particularly to such a ballast circuit that applies a feedback signal to the HVIC for selecting a suitable frequency of operation during lamp starting.

BACKGROUND OF THE INVENTION

One type of ballast circuit for a gas discharge lamp employs a pair of serially connected switches supplying a.c. current to the lamp, which is located in a resonant load circuit. The switches are configured in a half-bridge, Class D inverter configuration. Recently, a variety of high voltage integrated circuits (HVICs) have become available for driving such a half-bridge configuration in an alternating manner, i.e., first turning on one switch, turning it off, then turning on the second switch, turning it off, and so on. Beneficially, such HVICs could replace a variety of discrete circuit component at low cost and with reduction of ballast size. However, the HVICs are designed to provide a fixed frequency of switching of the pair of switches. While fixed frequency operation is typically suitable for steady state operation of gas discharge lamps, it is not suitable for operation during lamp ignition when it is desired that the frequency of the resonant load circuit approach its natural resonance frequency so as to result in a very high voltage spike necessary to cause lamp ignition.

It would, therefore, be desirable to overcome the foregoing deficiency of a mentioned HVIC so that, during lamp ignition, it will cause the resonant load circuit to approach its natural resonance frequency, to allow the generation of a high voltage spike to ignite the lamp.

OBJECTS AND SUMMARY OF THE INVENTION

It is, accordingly, is an object of the invention to provide a gas discharge ballast circuit incorporating a pair of serially connected switches for supplying a.c. current to a resonant load circuit, which circuit utilizes a HVIC for driving the pair of switches but which is configured to result in a frequency shift during lamp ignition towards the natural frequency of resonance of the load circuit.

In accordance with a preferred form of the invention, there is provided a ballast circuit for a gas discharge lamp. The ballast circuit includes a resonant load circuit incorporating a gas discharge lamp and including first and second resonant impedances whose values determine the operating frequency of the resonant load circuit. Further included is a d.c.-to-a.c. converter circuit coupled to the resonant load circuit so as to induce an a.c. current in the resonant load circuit. The converter includes first and second switches serially connected between a bus conductor at a d.c. voltage and ground, and has a common node through which the a.c. load current flows. A feedback circuit provides a feedback signal indicating the level of current in the resonant load circuit. A high voltage IC drives the first and second switches at a frequency determined by a timing signal which predominantly comprises the feedback signal during lamp ignition, whereby during lamp ignition the feedback signal causes the high voltage IC to drive the first and second switches towards a switching frequency which promotes resonant operation of the resonant load circuit.

BRIEF DESCRIPTION OF THE DRAWINGS

The foregoing objects and further advantages and features of the invention will become apparent from the following description when taken in conjunction with the drawing, in which like reference numerals refer to like parts, and in which.

DETAILED DESCRIPTION OF THE PREFERRED EMBODIMENTS

Figure 1:
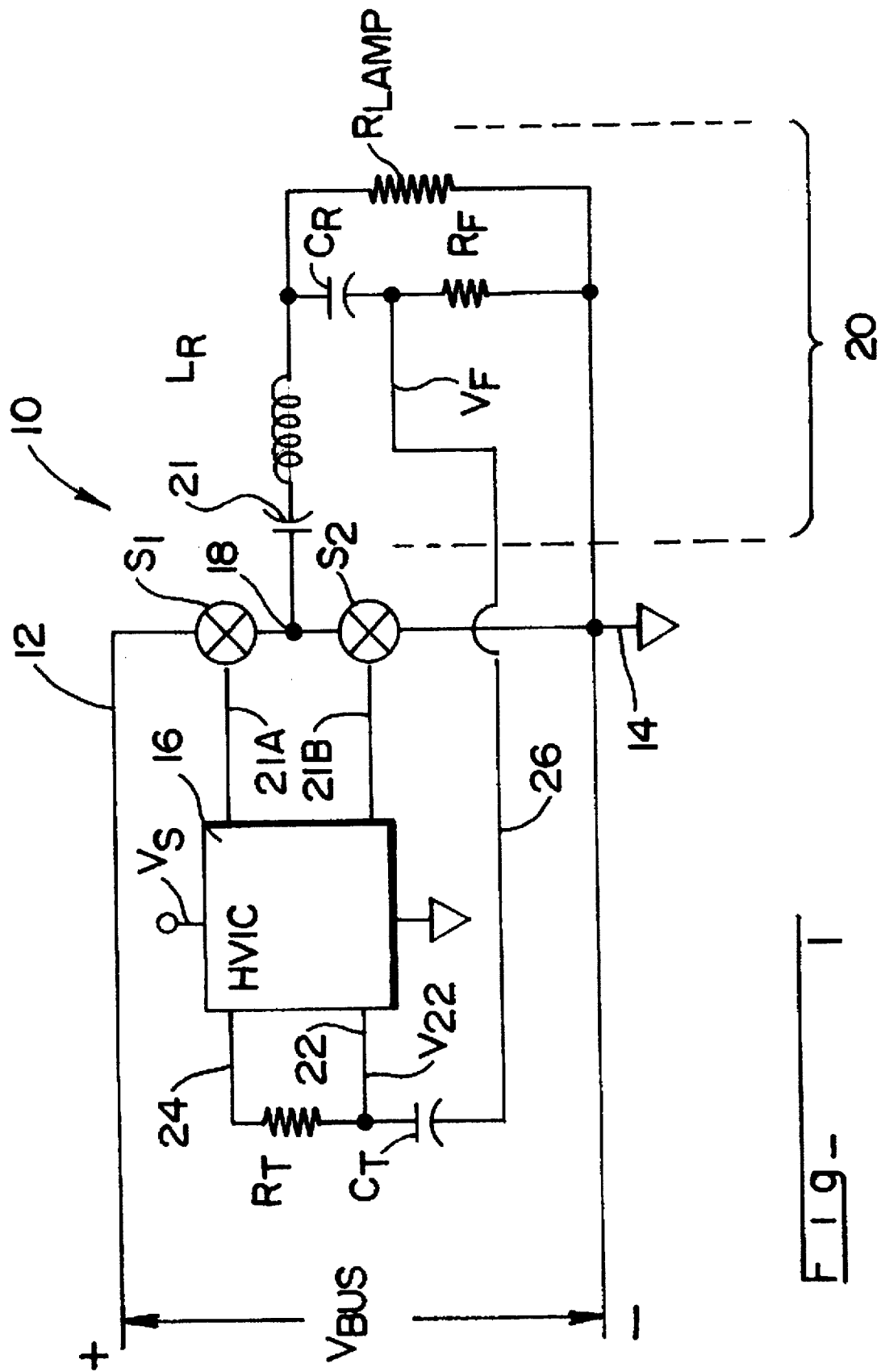
FIG. 1 is a schematic diagram, partly in block form, of a ballast circuit for a gas discharge lamp.

FIG. 1 shows a ballast circuit 10 for powering a gas discharge (e.g. fluorescent) lamp, which is designated $R_{LAMP}$, because it may exhibit resistive impedance during operation. Ballast circuit 10 includes a pair of serially connected switches $S_1$ and $S_2$, such as power MOSFETs, which are connected to receive a d.c. bus voltage $V_{BUS}$ between a bus conductor 12 and a ground 14. Control of switches $S_1$ and $S_2$ is provided by a high voltage integrated circuit (HVIC) 16, whose details are discussed below. By the alternate switching of $S_1$ and $S_2$, node 18 is alternately connected to bus voltage $V_{BUS}$ and to ground 14. A resonant load circuit 20, connected to node 18, includes a resonant inductor $L_R$, a resonant capacitor $C_R$, and the lamp $R_{LAMP}$. A capacitor 21 provides d.c. blocking for load circuit 20. A feedback resistor $R_F$ is further included for purposes to be discussed below. Due to its connection to node 18, a.c. current is induced in resonant load circuit 20.

HVIC 16 may comprise a half-bridge driver with oscillator, such as sold by SGS-Thompson under its product designation L6569, entitled "High Voltage Half Bridge Driver with Oscillator; or, such as sold by International Rectifier Company of El Segundo, Calif. under its product designation IR2151, and entitled "Self-Oscillating Half-Bridge Driver." Respective high and low voltage outputs 21A and 21B from HVIC 16 drive switches $S_1$ and $S_2$. A timing resistor $R_T$ and timing capacitor $C_T$ are shown connected to HVIC 16. Timing resistor $R_T$ is shown connected between a capacitor timing input 22 and a resistor timing input 24, as in conventional. Meanwhile, a timing capacitor $C_T$ is shown connected at one end to capacitor timing input 22, as is conventional; however, the connections for the other end of timing capacitor $C_T$ are not conventional, and, indeed, such connections relate to the inventive use of HVIC 16 in ballast circuit 10 so as to provide for the automatic generation of a very high voltage spike (e.g., 1,000–1,200 volts) across the lamp $R_{LAMP}$ during lamp ignition. Thus, a feedback signal, e.g., voltage $V_F$ is applied to the lower-shown end of timing capacitor $C_T$ by wire 26, which leads from the upper-shown end of feedback resistor $R_F$. In contrast, it would be conventional to connect the lower end of timing capacitor $C_T$ directly to ground, without any feedback voltage $V_F$ reaching timing input 22 of HVIC 16.

Both of the above-mentioned HVICs employ a timing input 22, which receives a timing signal $V_{22}$, with the resulting frequency of switching of switches $S_1$ and $S_2$ being determined by the respective times of transition of timing signal $V_{22}$ from one threshold voltage to another threshold voltage, and vice-versa. Thus, referring to FIG. 2, a possible timing signal $V_{22}$ is shown transitioning between a pair of voltage thresholds, which, as shown, may be ⅓ of a supply voltage $V_S$, which supplies HVIC of FIG. 1, and ⅔ of supply voltage $V_S$. Typically, when timing signal $V_{22}$ increases from the lower threshold and reaches the upper threshold, the upper end of timing resistor $R_T$ becomes connected to ground 26 so that timing signal $V_{22}$ discharges through the timing resistor. Similarly, when timing signal $V_{22}$ then decays to the lower threshold, the upper end of timing resistor $R_T$ is then connected to supply voltage $V_S$, causing timing signal $V_{22}$ to increase towards the upper threshold. At the transition points, e.g., at times $t_1$, $t_2$, $t_3$, and $t_4$ in FIG. 2, alternate switching of switches $S_1$ and $S_2$ is caused.

Prior to lamp ignition, the lamp $R_{LAMP}$ appears as an extremely high resistance. During this time, the so-called "Q" or quality factor of resonant load circuit 20 is very high, because the lamp does not add a significant (i.e., low) resistive load to the circuit. During this time, it is advantageous to control switches $S_1$ and $S_2$ so that the frequency of operation of resonant load circuit 20 approaches its natural resonance point. When this occurs, the voltage placed across the lamp achieves the very high spike necessary to cause lamp ignition.

Figure 3:
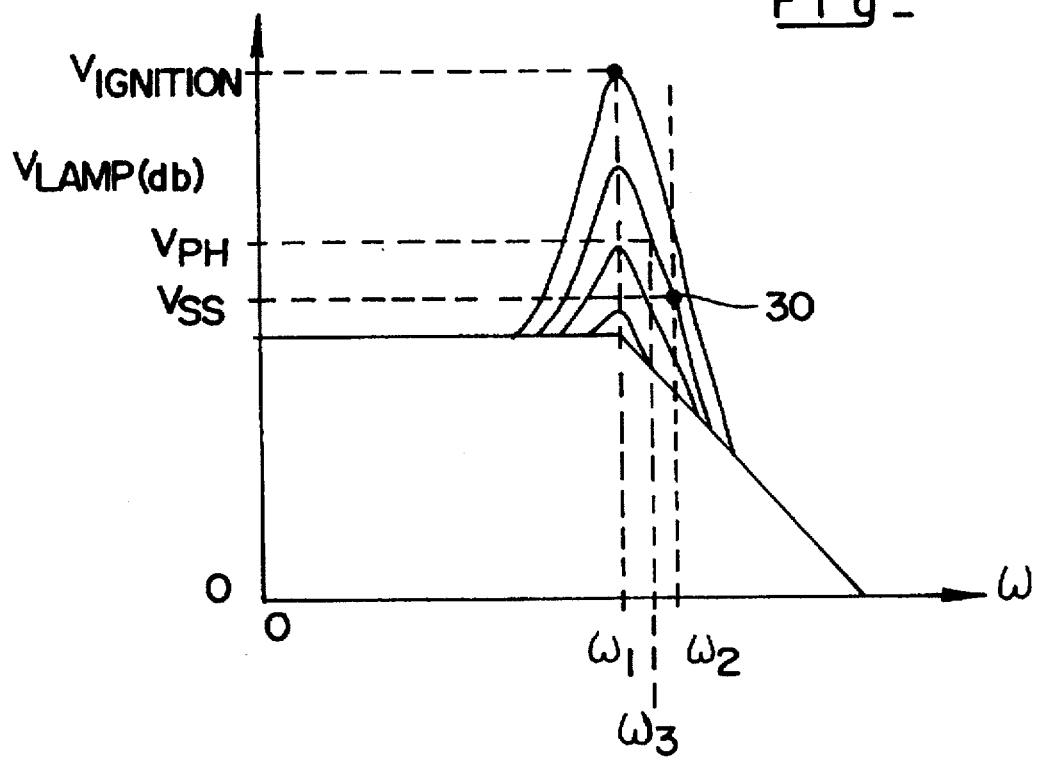
FIG. 3 is a simplified lamp voltage-versus-angular frequency graph illustrating operating points for lamp ignition and for steady state modes of operation.

FIG. 3 shows a simplified lamp voltage-versus-angular frequency graph to explain operation of the lamp as between ignition and steady state modes. Lamp voltage is measured in decibels, and angular frequency is measured in radians ($\epsilon$), i.e., 2; times frequency. At angular frequency $\epsilon_2$, a steady state operating point is shown at 30, at a steady state voltage $V_{SS}$. By decreasing the angular frequency to $\epsilon_1$, however, the lamp voltage rises sharply to $V_{IGNITION}$, which is sufficient to cause the lamp to ignite. After ignition, the lamp exhibits a much lower resistance, and adds to the lossiness of resonant load circuit 20, decreasing its Q factor, and, hence, resulting in the lower, steady state voltage $V_{SS}$.

Figure 2:
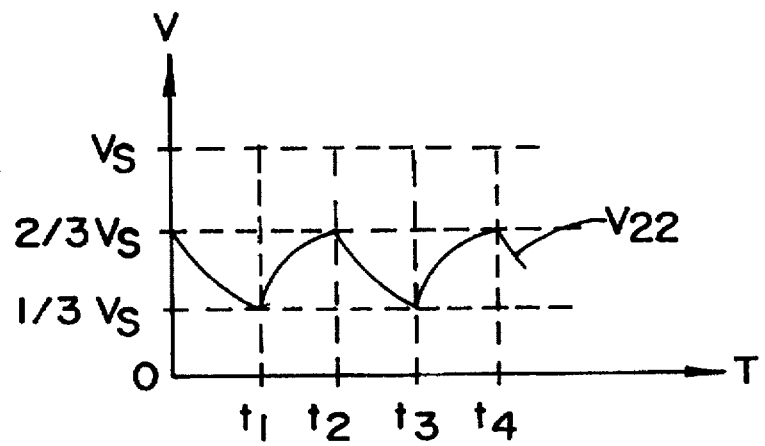
FIG. 2 is a voltage-versus-time graph of a typical timing signal applied to a timing input of a high voltage integrated circuit of FIG. 1.
Figure 4:
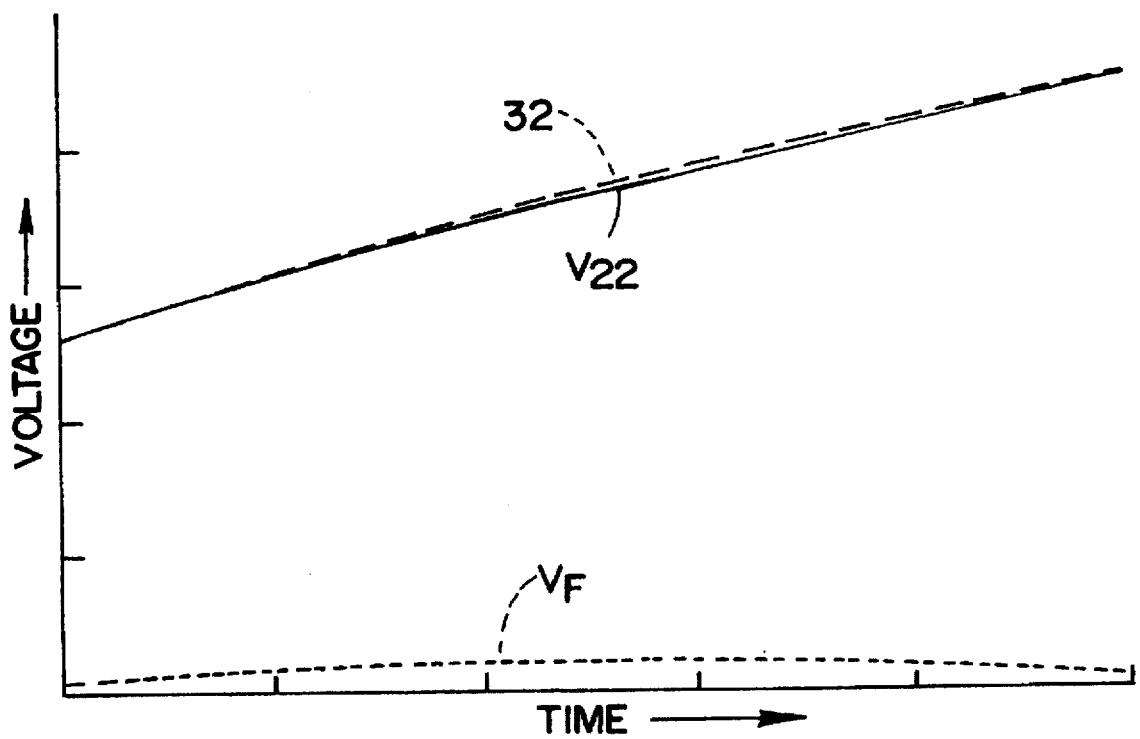
FIG. 4 is a plot of a timing voltage and related voltages versus time for steady state lamp operation.

By applying feedback signal $V_F$ to timing input 22 of HVIC 16, a desired shift in angular frequency will occur during lamp ignition to attain the very high voltage spike necessary for igniting the lamp. FIG. 2 shows a timing signal $V_{22}$ with substantially symmetrical upward and downward exponential transitions having the same time constant such as would occur if timing input 22 of HVIC 16 were connected in the conventional manner described above. This results in a fixed frequency of operation of the lamp, which would be suitable for steady state lamp operation. Timing voltage $V_{22}$ on timing input 22 of HVIC 16 constitutes the sum of voltage contributions from timing capacitor $C_T$ as it is charged or discharged, as well as a voltage contribution from feedback voltage $V_F$. During steady state lamp operation, feedback voltage $V_F$ is typically quite small in relation to the contribution due to the charging or discharging of timing capacitor $C_T$. Thus, during steady state lamp operation, timing voltage $V_{22}$ is predominantly determined by the charging or discharging of timing capacitor $C_T$. (Other embodiments, however, might have the timing voltage predominantly controlled by a feedback voltage during steady state operation.) FIG. 4 illustrates the summation of voltages to produce timing voltage $V_{22}$.

In FIG. 4, the solid curve shows timing voltage $V_{22}$. The longer dashed-line curve 32 shows the contribution due to charging of timing capacitor $C_T$. Meanwhile, the shorter dashed-line curve $V_F$ indicates a very small feedback signal. Thus, timing voltage $V_{22}$ is predominantly determined by the charging of capacitor $C_T$ during steady state operation. Now, referring to FIG. 5, these same voltages during lamp ignition are illustrated.

Figure 5:
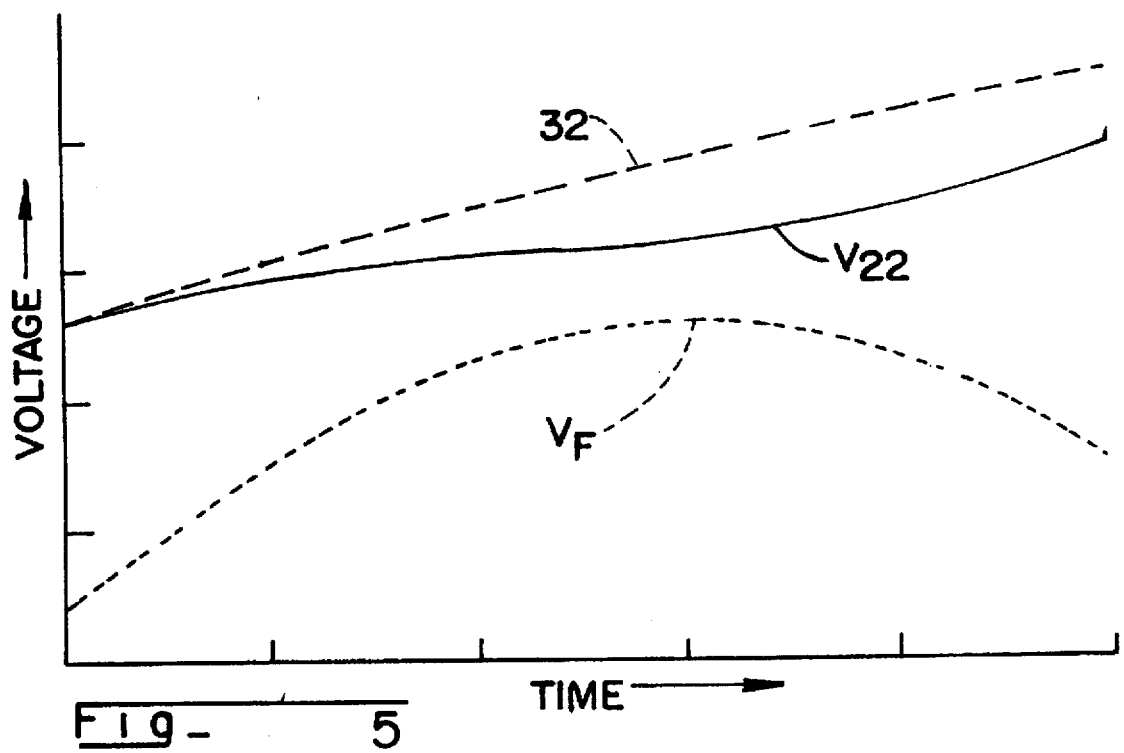
FIG. 5 is similar to FIG. 4 but illustrates voltages during lamp ignition.

Referring to FIG. 5, the invention takes advantage of the much higher voltages (and currents) present in resonant load circuit 20 during lamp ignition, when such circuit is essentially unloaded by the lamp (i.e., the lamp does not have a low resistance during this time). During lamp ignition, therefore, feedback signal $V_F$ will be very much higher than during steady state lamp operation. While curve 32 showing the contribution from charging of timing capacitor $C_T$ appears similar to as shown for the steady state case of FIG. 4, timing voltage $V_{22}$ in FIG. 5 does not increase as quickly. The reason is that, at timing input 22 of HVIC 16, the voltage contribution from timing capacitor $C_T$ is summed with the inverse value of feedback voltage $V_F$. For illustration, however, feedback voltage $V_F$ is shown, rather than its inverse value. Adding the inverse value of feedback voltage $V_F$ to curve 32 results in the significant lowering of timing voltage $V_{22}$ noted above. As a consequence, the transition time of timing voltage $V_{22}$ from one threshold to another, as discussed above in connection with FIG. 2, is increased. As can be appreciated from FIG. 2, the frequency of operation of HVIC 16 is reduced. Such reduction in frequency is from a steady state operating frequency $\epsilon_2$ shown in FIG. 3, towards the natural resonant frequency of resonant load circuit 20 shown at $\epsilon_1$. This results in the very high lamp voltage spike necessary for lamp ignition. However, once lamp ignition is achieved, feedback voltage $V_F$ and other voltage levels in the resonant load circuit sharply decrease, whereby such feedback voltage then has a negligible effect on timing voltage $V_{22}$ as described above in connection with FIG. 4.

For a 20-watt lamp, typical values for the components of ballast circuit 10 of FIG. 1 for a bus voltage $V_{BUS}$ of 170 volts are as follows: resonant inductor $L_R$, 800 micro henries; resonant capacitor $C_R$, 5.6 nanofarads; feedback resistor $R_F$, 3.3 ohms; d.c. blocking capacitor 21, 0.22 micro farads; timing resistor $R_T$, 10.5 K ohms, and timing capacitor $C_T$, 0.001 microfarads.

Figure 6:
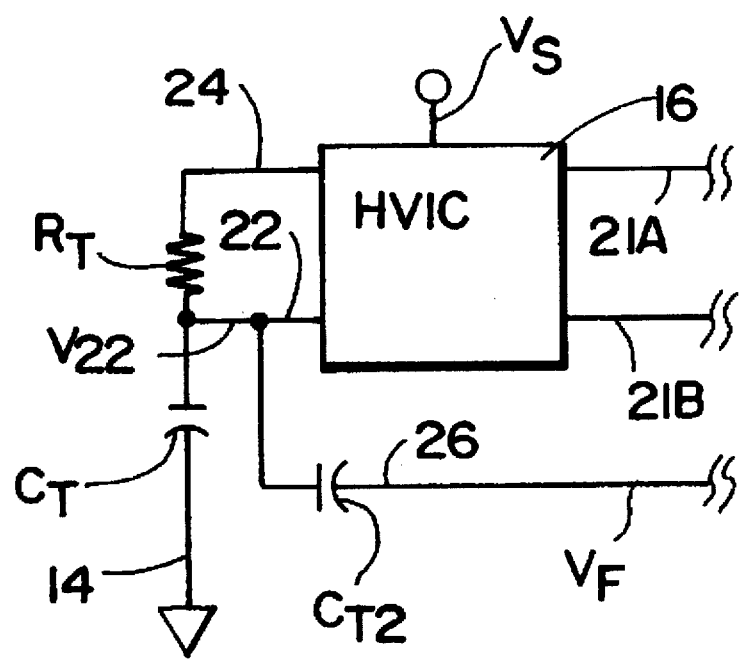
FIG. 6 is a detail, schematic diagram, partially in block form, an alternative circuit for applying a feedback voltage to a timing input of a high voltage integrated circuit.

FIG. 6 shows an alternative circuit for applying feedback voltage $V_F$ to timing input 22. As shown, feedback voltage $V_F$ is applied via a feedback timing capacitor $C_{T2}$ to timing input 22 of HVIC 16. The lower end of timing capacitor $C_T$ is connected directly to ground 14. In this embodiment, feedback voltage $V_F$ is capacitively coupled to timing input 22, and is summed at that input with the voltage across timing capacitor $C_T$. The behavior of the resulting ballast circuit is similar to that described above in connection with FIG. 1. In particular, the feedback voltage $V_F$ predominates during lamp ignition in establishing timing voltage $V_{22}$, while the voltage across timing capacitor $C_T$ predominates during steady state lamp operation.

As mentioned above, embodiments of the invention can be made in which the feedback voltage $V_F$ predominates in establishing timing voltage $V_{22}$ both during lamp ignition and during steady state operation. For instance, the resistance of feedback resistor $R_F$ could be increased to increase the feedback voltage $V_F$ across it. Then, as opposed to the negligible contribution made by feedback voltage $V_F$ according to FIG. 4, the feedback voltage $V_F$ during steady state operation could be so large as to predominate over the contribution made by timing capacitor $C_T$. However, due to the increased resistive losses that would result in the feedback resistor $R_F$, the foregoing embodiment is not the preferred embodiment.

While the invention has been described with respect to specific embodiments by way of illustration, many modifications and changes will occur to those skilled in the art. It is therefore, to be understood that the appended claims are intended to cover all such modifications and changes as fall within the true spirit and scope of the invention.

What is claimed is:

1. A ballast circuit for a gas discharge lamp, comprising:
  (a) a resonant load circuit including first and second resonant impedances whose values determine the operating frequency of said resonant load circuit; said load circuit including means for incorporating a gas discharge lamp;
  (b) a d.c.-to-a.c. converter circuit coupled to said resonant load circuit so as to induce an a.c. current in said resonant load circuit, and comprising first and second switches serially connected between a bus conductor at a d.c. voltage and ground, and having a common node through which said a.c. load current flows;
  (c) a feedback circuit for providing a feedback signal proportional to the level of current in said resonant load circuit so as to contain information of whether the lamp has ignited; and
  (d) a high voltage IC for driving said first and second switches at a frequency determined by a timing signal which predominantly comprises said feedback signal during lamp ignition, whereby during lamp ignition said feedback signal causes said high voltage IC to drive said first and second switches in continuous manner towards a switching frequency which promotes resonant operation of said resonant load circuit.

2. The ballast circuit of claim 1, wherein said feedback circuit is so constructed as to make said timing signal, during steady state lamp operation, predominantly determined by a signal other than said feedback signal.

3. The ballast circuit of claim 1, wherein:
  (a) said high voltage IC includes a timing input that receives said timing signal, with the frequency of switching being determined by the respective times of transition of said timing signal from one threshold voltage to another threshold voltage, and vice-versa; and
  (b) said feedback signal is summed at said timing input with a signal which, in the absence of said feedback signal, would yield fixed-frequency operation of said first and second switches.

4. The ballast circuit of claim 1, wherein said timing input comprises a capacitor timing input to which one end of a timing capacitor is connected.

5. The ballast circuit of claim 4, wherein another end of said timing capacitor is connected to ground via a feedback resistor located in said resonant load circuit.

6. The ballast circuit of claim 5, wherein said feedback resistor is serially connected to said resonant capacitor.

7. The ballast circuit of claim 4, wherein:
  (a) another end of said timing capacitor is connected directly to ground; and
  (b) a feedback voltage from said resonant load circuit is applied to said capacitor timing input via a feedback timing capacitor.

8. The ballast circuit of claim 4, wherein:
  (a) said high voltage integrated circuit includes a resistor timing input; and
  (b) a timing resistor is connected between said resistor timing input and said capacitor timing input.

9. The ballast circuit of claim 1, wherein said gas discharge lamp comprises a fluorescent lamp.

10. A ballast circuit for a fluorescent lamp, comprising:
  (a) a resonant load circuit including first and second resonant impedances whose values determine the operating frequency of said resonant load circuit; said load circuit including means for incorporating a gas discharge lamp;
  (b) a d.c.-to-a.c. converter circuit coupled to said resonant load circuit so as to induce an a.c. current in said resonant load circuit, and comprising first and second switches serially connected between a bus conductor at a d.c. voltage and ground, and having a common node through which said a.c. load current flows;
  (c) a feedback circuit for providing a feedback signal proportional to the level of current in said resonant load circuit so as to contain information of whether the lamp has ignited; and
  (d) a high voltage IC for driving said first and second switches; said high voltage IC including a timing input that receives a timing signal, with the frequency of switching of said first and second switches being determined by the respective times of transition of said timing signal from one threshold voltage to another threshold voltage, and vice-versa;
  (e) said timing signal predominantly comprising said feedback signal during lamp ignition, whereby during lamp ignition said feedback signal causes said high voltage IC to drive said first and second switches in continuous manner towards a switching frequency which promotes resonant operation of said resonant load circuit.

11. The ballast circuit of claim 10, wherein said feedback signal is summed at said timing input with a second signal which, in the absence of said feedback signal, would yield fixed-frequency operation of said first and second switches.

12. The ballast circuit of claim 11, wherein said feedback circuit is so constructed as to make said timing signal, during steady state lamp operation, predominantly determined by said second signal.

13. The ballast circuit of claim 10, wherein said timing input comprises a capacitor timing input to which one end of a timing capacitor is connected.

14. The ballast circuit of claim 13, wherein another end of said timing capacitor is connected to ground via a feedback resistor located in said resonant load circuit.

15. The ballast circuit of claim 14, wherein said feedback resistor is serially connected to said resonant capacitor.

16. The ballast circuit of claim 10, wherein:
  (a) another end of said timing capacitor is connected directly to ground; and
  (b) a feedback voltage from said resonant load circuit is applied to said capacitor timing input via a feedback timing capacitor.

17. The ballast circuit of claim 10, wherein:
  (a) said high voltage integrated circuit includes a resistor timing input; and
  (b) a timing resistor is connected between said resistor timing input and said capacitor timing input.

* * * * *